(12) United States Patent
Finzo

(10) Patent No.: US 9,487,314 B2
(45) Date of Patent: Nov. 8, 2016

(54) STRAPPING APPARATUS

(71) Applicant: Signode Industrial Group LLC, Glenview, IL (US)

(72) Inventor: Flavio Finzo, Würenlos (CH)

(73) Assignee: Signode Industrial Group LLC, Glenview, IL (US)

( * ) Notice: Subject to any disclaimer, the term of this patent is extended or adjusted under 35 U.S.C. 154(b) by 80 days.

(21) Appl. No.: 14/357,959

(22) PCT Filed: Nov. 14, 2012

(86) PCT No.: PCT/US2012/064922
§ 371 (c)(1),
(2) Date: May 13, 2014

(87) PCT Pub. No.: WO2013/074563
PCT Pub. Date: May 23, 2013

(65) Prior Publication Data
US 2015/0033959 A1    Feb. 5, 2015

(30) Foreign Application Priority Data
Nov. 14, 2011   (CH) ........................................ 1820/11

(51) Int. Cl.
| B65B 13/02 | (2006.01) |
| B65B 13/22 | (2006.01) |
| B65B 13/18 | (2006.01) |
| B65B 13/32 | (2006.01) |
| B65B 27/06 | (2006.01) |
| B65B 51/06 | (2006.01) |
| B65H 54/62 | (2006.01) |

(52) U.S. Cl.
CPC ........... B65B 13/025 (2013.01); B65B 13/185 (2013.01); B65B 13/22 (2013.01);
(Continued)

(58) Field of Classification Search
CPC ....... B65B 13/04; B65B 13/14; B65B 13/24; B65B 13/26; B65B 13/28; B65B 13/025; B65B 13/185; B65B 13/22; B65B 13/322; B65B 13/327; B65B 51/06; B65B 27/06; B65H 54/62; B65H 2701/34
USPC ....... 100/26, 29, 30, 31, 32, 33 R, 33 PB, 2; 140/93.6, 111, 115, 118; 53/589
See application file for complete search history.

(56) References Cited

U.S. PATENT DOCUMENTS

| 2,707,429 A * | 5/1955 | Leslie, II ................ B65B 13/06 100/12 |
| 3,873,387 A | 3/1975 | Schoening |

(Continued)

FOREIGN PATENT DOCUMENTS

| CN | 1109014 A | 9/1995 |
| CN | 1386676 A | 12/2002 |

(Continued)

OTHER PUBLICATIONS

International Search Report for PCT/US2012/064922 dated Mar. 28, 2013.

*Primary Examiner* — Jimmy T Nguyen
(74) *Attorney, Agent, or Firm* — Levenfeld Pearlstein, LLC

(57) ABSTRACT

A strapping apparatus for strapping articles with a strapping band includes a base plate having a base surface for arranging on an article, a tensioning device for applying a band tension to the strapping band, the tensioning device having an actuable tensioning tool which can be brought into and out of contact with the band and a sealing device to permanently connect two band layers to each other. The sealing device includes a counter-holder surface for bearing against one side of the band and a sealing head for bearing against another side of the band while a seal is produced, and a clamp for clamping the band in the strapping apparatus. The strapping apparatus also produces a twist of the band in a band section adjoining the sealing device during production of the seal with respect to a longitudinal direction of the band.

14 Claims, 3 Drawing Sheets

(52) U.S. Cl.
CPC .......... *B65B 13/322* (2013.01); *B65B 13/327* (2013.01); *B65B 27/06* (2013.01); *B65B 51/06* (2013.01); *B65H 54/62* (2013.01); *B65H 2701/34* (2013.01)

(56) References Cited

U.S. PATENT DOCUMENTS

| | | | |
|---|---|---|---|
| 4,077,313 A | 3/1978 | Lems | |
| 4,378,262 A * | 3/1983 | Annis, Jr. | ............... B29C 65/06 100/2 |
| 4,836,873 A * | 6/1989 | Mitanihara | ............. B65B 13/06 100/2 |
| 5,333,438 A * | 8/1994 | Gurak | ..................... B65B 13/20 100/24 |
| 7,086,213 B2 * | 8/2006 | Stauber | ................... B65B 13/06 100/1 |

FOREIGN PATENT DOCUMENTS

| | | |
|---|---|---|
| CN | 1396091 A | 2/2003 |
| CN | 102101539 A | 6/2011 |
| GB | 1136847 A | 12/1968 |
| WO | 2009129634 A1 | 10/2009 |

* cited by examiner

STRAPPING APPARATUS

CROSS-REFERENCE TO RELATED APPLICATIONS

This is a US national stage application of International Patent Application No. PCT/US2012/064922, filed Nov. 14, 2012, which claims priority to Switzerland Patent Application No. 01820/11, filed on Nov. 14, 2011, the disclosure of which is incorporated fully by reference herein.

BACKGROUND

The invention relates to a strapping apparatus for strapping articles with a strapping band, having a base plate which is provided with a base surface for arranging on an article, having a tensioning device with which a band tension can be applied to the strapping band, the tensioning device being provided for this purpose with an actuable tensioning tool which can be brought into and out of contact with the band, having a sealing device with which, by contact with the band, two band layers can be permanently connected to each other by forming a seal between the two band layers, the sealing device being provided in this case with a counter-holder surface for bearing against one side of the band and a sealing head for bearing against another side of the band while a seal is produced, and being provided with a clamping device with which the band can be clamped in the strapping apparatus.

Mobile strapping apparatuses of this type, like the strapping apparatus according to the invention, are used for strapping articles with a plastics strap. For this purpose, a loop of the particular plastics strap is placed around the article. The plastics strap is generally pulled off here from a supply reel. After the loop is completely placed around the article, the end region of the band overlaps with a section of the band loop. The strapping apparatus is then applied to said two-layered region of the band, the band is clamped in the process in the strapping apparatus, a band tension is applied to the band loop by means of the tensioning device, and a seal is produced between the two band layers by friction welding at the loop. In this connection, pressure is applied to the band in the region of two ends of the band loop by a friction shoe moving in an oscillating manner. The pressure and the heat arising because of the movement melt the band, which generally contains plastic, locally for a short time. This results in a permanent connection, which at the most can be released again with a great force, between the two band layers between the two band layers. At the same time, the loop is severed from the supply reel. The respective article is thereby strapped.

Strapping apparatuses of the type in question are provided in particular for mobile use, in which the units are intended to be carried along by a user to the particular use location and are not intended to be dependent there on the use of externally supplied mains power. In the case of previously known strapping units, the power required for the designated use of such strapping units for tensioning a strapping band around any article and for producing a seal is generally provided by an electric battery or by compressed air. Mobile strapping apparatuses of the type in question are frequently in permanent use in the goods packaging industry. Therefore, as simple an operation of the strapping apparatuses as possible is sought. This is intended, firstly, to ensure high functional reliability of the strapping apparatus and, secondly, the smallest possible loads for the operators.

The operation of the strapping apparatus also includes the fact that, after production of the seal between the two band layers, the band has to be removed again from the strapping apparatus. In this connection, it is frequently apparent that the band can be removed from the strapping apparatus only with energy and effort rather than easily, although the tensioning device, the clamping device and the sealing device release the band.

SUMMARY

The invention is therefore based on the object of developing strapping apparatuses of the type mentioned at the beginning in such a manner that the strapping band can more easily be removed from the strapping apparatus after strapping is produced.

According to a further aspect of the invention, the intention is to provide a possibility by means of which, during the production of strapping, the energy required for this purpose can be reduced.

This object is achieved according to the invention in a strapping apparatus of the type mentioned at the beginning by means of the strapping apparatus for producing a twisting of the band in a band section adjoining the sealing device, at least during the production of the seal and with respect to a longitudinal direction of the band.

In previous strapping apparatuses, it has always been endeavoured to guide the band with as uniform an orientation as possible through the strapping unit. According to the invention, it has now been recognized that the very twisting of the band in the sealing device with respect to a band section, which belongs to the strapping, from the sealing device toward a clamping point of the band in the strapping apparatus, which twisting has hitherto always been avoided, can result in a significantly simpler separating of the band from the sealing device. As has been shown, in spite of the twisting of the band, seals between the two band layers, in particular friction welding connections in the case of plastic bands, can be reliably produced. Owing to the twisting, the band has the tendency to relax counter to the twisting direction. This is prevented during the production of the seal, in the case of preferably used friction welding devices as a sealing device in the respective strapping apparatus, by means of a welding counter-holder, against which one of the two band layers bears, and by means of the welding shoe which bears against the other band layer and moves in an oscillating manner to and fro with a contact pressure. As soon as the seal has been produced and the sealing device releases the band again, the twisted band follows the resetting forces present in the band because of the twisting and rotates back again into a torsion-free position. By means of this rotational movement of the band, the latter, after being released by the sealing device, is detached from the strapping apparatus virtually by itself or, in the event of an embodiment of a mobile strapping unit, said unit can easily be removed by a lateral pulling-off movement from the article and the strapping band.

In particular in conjunction with mobile strapping units, the twisting of the band has resulted in a completely surprising and nonforeseeable additional effect. By means of this measure, a greater number of strappings could be produced with battery-operated strapping apparatuses and is possible with otherwise unchanged strapping units and batteries of identical capacity. This means that, by the twisting of the band, less energy is required for the friction welding process than is required without twisting of the band.

Within the context of the invention, it has been shown that a reduction in the energy required for producing a welding seal can also be obtained by a reduction in the band tension in the region between the sealing device and the clamping device. Precisely such a reduction in the band tension is produced during the production of a seal on a twisted band section, that is, for example, the result of an inclined counter-holder surface of a sealing device, without further measures having to be taken for this. This produces a loop or deflection in the abovementioned band section during the production of the seal.

However, the band tension can be reduced even when the counter-holder surfaces are not inclined and the band sections are not twisted, for example by the fact that, by means of the tensioning device, by an in particular temporary actuation once again of the tensioning device after the band has already been tensioned previously and after the sealing device is already clamping the band, the band is pulled back in the direction of the sealing device. The object is therefore also achieved in the case of strapping apparatuses of the type mentioned at the beginning by means, by means of which, after application of a band tension to the band and during the production of a seal on a band section between the clamping device and the tensioning device, the band tension is reduced.

In order to produce the desired twisting of the band, different measures can be taken. A preferred and structurally simple solution consists in the preferably planar surfaces of the friction welding device, with which the latter bears against the band layers during the friction welding, being inclined transversely with respect to the band running direction and with respect to the at least one or more surfaces of the clamping device, which are used to secure the band during the friction welding.

One or more band clamps previously known per se can be used as the clamping device in the strapping apparatus according to the invention. However, in conjunction with the sealing device, it is preferred for the tensioning device which, for tensioning purposes, is already in engagement by means of the tensioning wheel thereof with the band and grasps the latter at least in a very substantially slip-free manner also to clamp the band after the end of the tensioning operation and therefore to act and be used as a clamping device in this phase of producing the strapping.

Further preferred refinements of the invention emerge from the claims, the description and the drawing.

BRIEF DESCRIPTION OF THE DRAWINGS

The invention is explained in more detail with reference to exemplary embodiments which are illustrated purely schematically in the figures, in which.

DETAILED DESCRIPTION

Figure 1:
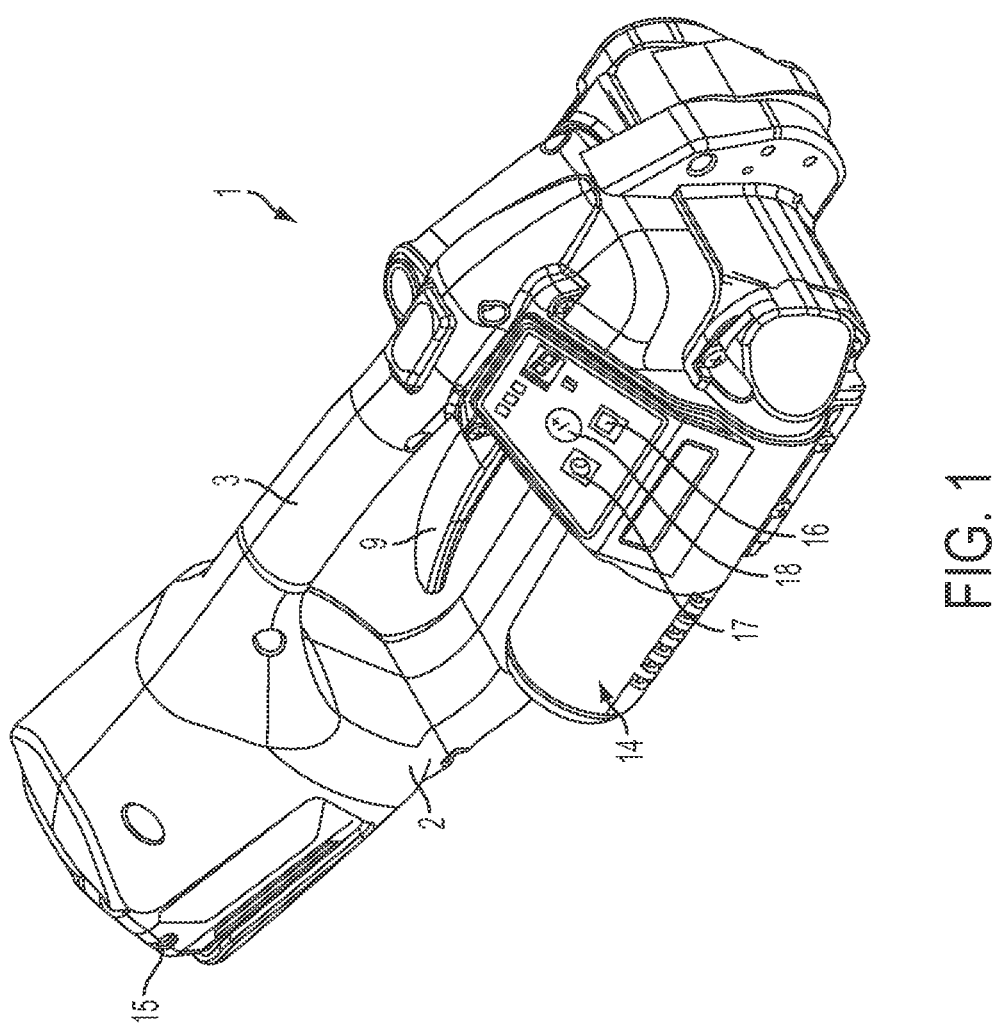
FIG. 1 shows a perspective illustration of a strapping apparatus according to the invention.
Figure 2:
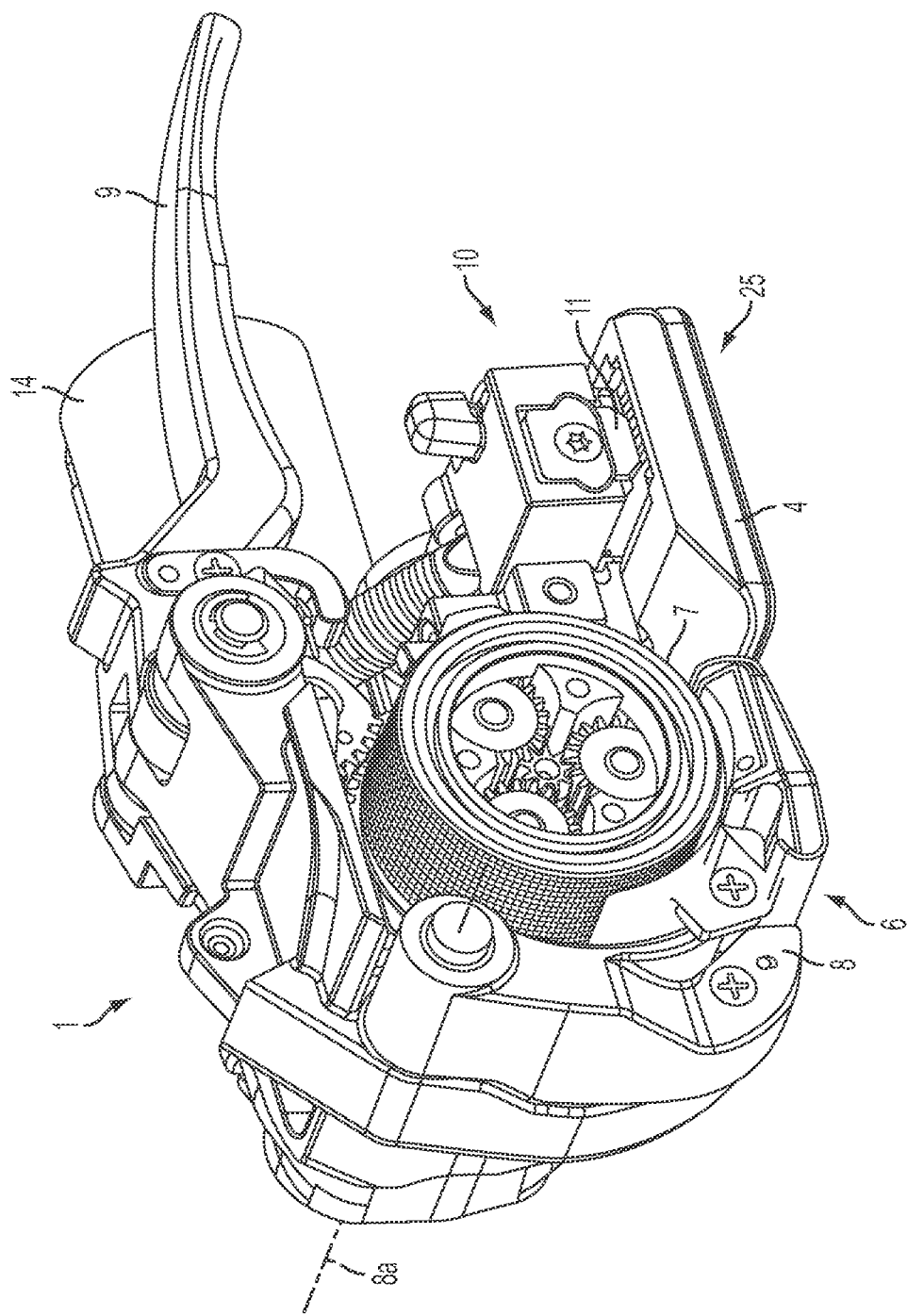
FIG. 2 shows the strapping unit from FIG. 1 without the housing.

The mobile strapping unit 1 according to the invention that is shown in FIGS. 1 and 2 and is exclusively manually actuated has a housing 2 which surrounds the mechanism of the strapping unit and on which a handle 3 for handling the unit is formed. The strapping unit is furthermore provided with a base plate 4, on the lower side of which a base surface 5 for arranging on an object to be packaged is provided. All of the functional units of the strapping unit 1 are fastened on the base plate 4 and to the strapping unit carrier (not illustrated specifically) which is connected to the base plate.

With the strapping unit 1, a loop (not illustrated specifically in FIG. 1) of a plastics band, for example of polypropylene (PP) or polyester (PET), which has previously been placed around the object to be packaged can be tensioned by means of a tensioning device 6 of the strapping unit. For this purpose, the tensioning device has, as tensioning tool, a tensioning wheel 7 with which the band can be detected for a tensioning operation. In this connection, the tensioning wheel 7 interacts with a rocker 8 which can be pivoted about a rocker pivot axis 8a by means of a rocker lever 9 from an end position at a distance from the tensioning wheel into a second end position, in which the rocker 8 is pressed against the tensioning wheel 7. In the process, the band located between the tensioning wheel 7 and the rocker 8 is also pressed against the tensioning wheel 7. It is then possible, by rotation of the tensioning wheel 7, to provide the band loop with a sufficiently high band tension for the packaging purpose.

Subsequently, at a point of the band loop at which two layers of the band lie one above the other, the two layers can be welded by means of the sealing device embodied in the form of a friction-welding device 13 of the strapping unit. By this means, the band loop can be permanently sealed. For this purpose, the friction-welding device 13 is provided with a welding shoe 20 which melts the two layers of the strapping band by applying mechanical pressure to the strapping band and simultaneously undertaking an oscillating movement at a predetermined frequency. The plasticized and molten regions of the two band layers flow into each other and, after the band is cooled during a cooling time, a connection then arises between the two band layers. If required, the band loop can then be severed at the same time from a supply reel (not illustrated) of the band by means of a cutting device (not illustrated specifically) of the strapping unit 1. The strapping unit 1 can subsequently be removed from the article and the band strapping produced.

The actuation of the tensioning device 6, the advancing of the friction-welding device 13 by means of a transfer device of the friction-welding device 13 and the use of the friction-welding device per se and also the actuation of the cutting device take place using just one common electric motor 14 which provides a driving movement for each of said components. The structural solution provided for this purpose corresponds to that described in WO 2009/129634 A1, the disclosure of which is hereby incorporated by reference. For the supply of power, a battery 15 which is interchangeable and in particular is removable for charging is arranged on the strapping unit. A supply of another external auxiliary power, such as, for example, compressed air, or further electricity, is not provided in the strapping unit according to FIGS. 1 and 2.

In the present case, the portable, mobile strapping unit 1 has an actuating element 16 which is embodied in the form of a pressure switch, is provided for starting up the motor and is referred to below as tensioning button. Three modes can be set for the actuating element 16 by means of a mode switch 17. In the first mode, both the tensioning device 6 and the friction-welding device 13 are triggered successively and in an automated manner by actuation of the actuating element 16, without further activities of an operator being required. In order to set the second mode, the switch is switched into a second switching mode. In the second possible mode, only the tensioning device 6 is then triggered by actuation of the tensioning button 16. For the separate triggering of the friction-welding device 13, the tensioning button 16 has to be actuated a second time by the operator. The third mode is of a semi-automatic type, in which the actuating element provided the tensioning button 16 has to be pressed until the tensioning force, which is preadjustable in stages, or tensile stress is achieved in the band. In this mode, it is possible to interrupt the tensioning process by releasing the tensioning button 16, for example in order to attach edge protectors under the strapping band to the article being strapped. By pressing of the tensioning button 16, the tensioning process can then be continued again. This third mode can be combined both with a friction-welding operation to be triggered separately and with an automatically following friction-welding operation.

The power supply is ensured by the battery 15 in the form of a lithium-ion battery. Batteries of this type are based on a plurality of independent lithium-ion cells, in which chemical processes which are in each case at least substantially separate from one another proceed in order to produce a potential difference between two poles of the particular cell. The exemplary embodiment involves a lithium-ion battery from the manufacturer Robert Bosch GmbH, D-70745 Leinfelden-Echterdingen. The battery in the exemplary embodiment has 20 cells and a capacity of 2.6 ampere-hours at an operating voltage of 36 volts.

Figure 4:
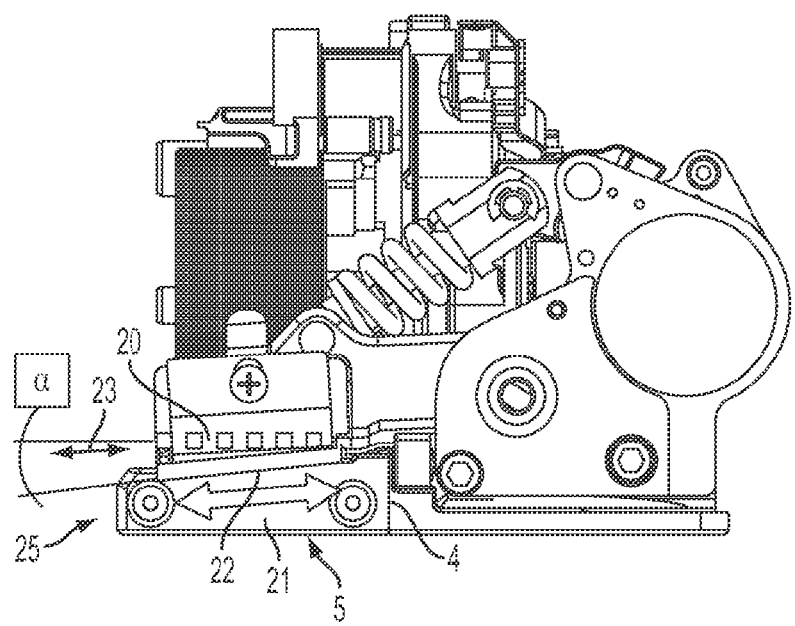
FIG. 4 shows the strapping unit in a view from the rear toward the sealing device.

As can be seen in particular in the view from the rear in FIG. 4, the sealing device which is embodied in the form of a friction-welding device has a plate with a substantially rectilinear or planar counter-holder surface 22 as the welding counter-holder 21. With regard to a direction 23 transverse to the longitudinal course 24 of the band section passed through the sealing device, the counter-holder surface 22 is inclined downwardly toward that outer side 25 of the strapping unit 1 on which the tensioning and sealing devices are located. The inclination takes place at a preferred angle α of 3° with regard to a course or an alignment of the tensioning counter-holder surface of the tensioning counter-holder 27, which is arranged on the rocker 8 and interacts with the tensioning wheel, in a direction transverse to the longitudinal course 24 of the band through the strapping apparatus. As an alternative thereto, the angle α may be selected from a range of 1° to 45°, preferably from a range of 2° to 25°, and especially preferably from a range of 3° to 10°. It has to be noted that every value which is part of the afore-mentioned ranges is hereby disclosed, particularly as being part of preferred embodiments of the invention. The tensioning counter-holder surface is of concave design in the longitudinal direction 24, and therefore, when the rocker presses against the tensioning wheel 7, the band bears in a planar manner both against the tensioning wheel surface and against the tensioning counter-holder surface 28. Therefore, in directions transverse to the longitudinal course of the band, the alignment of the tensioning wheel surface also corresponds to the alignment of the tensioning counter-holder surface 28.

The inclination may also be related to the base plate 4, in particular to the base surface 5 provided for arranging on articles. The base surface 5 is likewise of flat design, and therefore the strapping unit 1 can be arranged in as planar a manner as possible on the particular article. If the base surface is considered to be an X-Y surface of a Cartesian coordinate system, the inclination of the counter-holder surface 22 can be described by the counter-holder surface 22 having a linearly constant increase of the Z component in the Y direction if the X direction is considered to be parallel to the longitudinal direction 24 of the strapping unit. In the illustration of FIG. 4, this results in a conical arrangement between the counter-holder surface 22 and the base surface 5, wherein the arrangement of the two surfaces 5, 22 tapers toward that outer side of the strapping unit on which the counter-holder surface 22 is located.

During the formation of a seal, after the band is placed as a loop around the article, in the process guided as a single layer through the tensioning device 6 and as a double layer through the sealing device, and the designated band tension is applied by engagement of the tensioning device 6 in the upper band layer, which is guided through the tensioning device 6, and a return motion of the band, the welding shoe 20 is lowered in the direction of the counter-holder surface 22. Depending on the selected operating mode of the strapping unit 1, this takes place automatically as a consequence of the tensioning operation being finished or on account of separate triggering of the friction-welding operation by actuation of the button provided for this purpose. During the friction-welding operation, the band continues to be clamped between the tensioning wheel 7 and the tensioning counter-holder 27 and is held there during the formation of the seal. During this method section of the formation of the strapping, the tensioning device has the function of a band clamp or clamping device which, by means of two interacting clamping elements, clamps the band therebetween.

The lowering of the welding shoe 20 causes the two band layers passed through the sealing device to be pressed against each other and against the counter-holder surface 22. Owing to the clamping of the band in the tensioning device 6 and the inclination of the counter-holder surface 22, a twisting, i.e. torsional stress of the band, arises here in said band section. The band here is aligned with the two band surfaces thereof parallel to the base surface 5 at least in the region of a radius line of the tensioning wheel 7, said radius line being oriented perpendicularly to the base surface 5. The band is arranged in two layers in the sealing device, wherein the lower band layer rests with the lower band surface thereof against the inclined counter-holder surface 22 and is pressed thereagainst. With the upper surface, the lower band layer rests against the lower surface of the upper band layer. The welding shoe 20 presses onto the upper surface of the upper band layer. Both band layers and the welding shoe 20 therefore take up the same inclination a as the inclination of the counter-holder surface. The twisting of the band (as seen in a direction coming from the loop of the band, which surrounds the article, towards the tensioning device) therefore increases from the tensioning device 6 as far as the sealing device. The twisting decreases again during the further course of the band behind the sealing device, i.e. in the direction away from the strapping unit.

In this position of the band, the friction-welding device 13 begins with the formation of the seal by means of the oscillating movement of the welding shoe transversely with respect to the longitudinal course of the band. By this means, the two band layers resting against each other are melted. The materials of the band layers flow into one another and are connected in an integrally bonded manner during the subsequent cooling as soon as the oscillating movement of the welding shoe is started.

Figure 3:
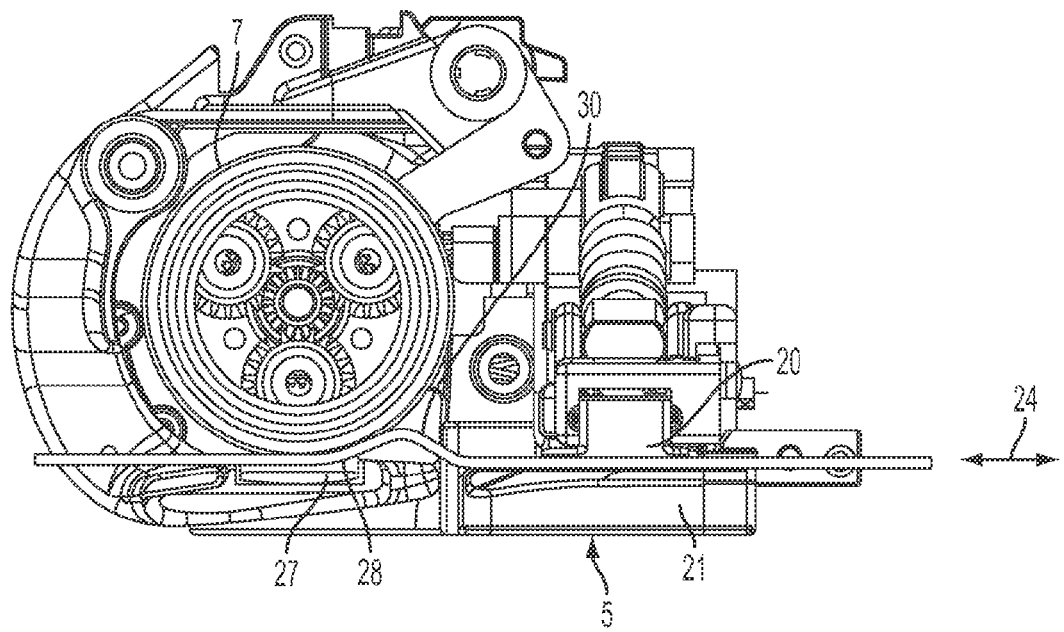
FIG. 3 shows the strapping unit from FIG. 2 with an inserted strapping band during the production of a seal.

As can be gathered from FIG. 3, during the production of the seal, a deflection or loop 30 is formed in the upper band layer between the clamping of the band in the tensioning device and the sealing device by the welding shoe 20 moving in an oscillating manner. The deflection or loop 30 is generated in a direction of the upper band layer which is substantially transverse to the direction of the oscillating movement of the welding shoe and also substantially transverse to the longitudinal extent of the respective section of the upper band layer before the deflection or loop 30 is formed in the upper band layer. As has been shown, said loop is formed on account of the twisting of the band, thus reducing the power required for the welding movement of the welding shoe.

The welding shoe 20 is subsequently moved away from the counter-holder surface 22 and the tensioning device 6 detached from the band, thus loosening the clamping and releasing the two band layers. The resetting forces present in the band counter to the twisting lead to the band showing at least a tendency to automatically become detached from the counter-holder surface 22 and from the welding shoe 20. Such a detachment preferably already takes place entirely because of the resetting forces of the band. If the detachment does not already take place by this means, at least the forces additionally to be applied in order to detach the band and remove the latter from the sealing device are considerably reduced because of the resetting forces. In addition, the inclination of the counter-holder surface 22 and the associated geometrical formation of the sealing device also permit simpler removal of the band and simpler moving away of the strapping unit from the band strapping produced directly beforehand.

The strapping unit according to the invention is provided with a control panel which has a plurality of pressure-actuable buttons 17, 30, 31, 33 as actuating elements. With said buttons, the previously described different modes of the strapping unit and parameters of the strapping operations can be preselected and set. For example, by pressing a welding time button 30 once or repeatedly, the welding time can be selected from one of a plurality of welding time stages and stored. The tensioning force can be selected as one of a plurality of tensioning force stages, changed and stored by means of a tensioning force button 31. The values preset in such a manner are displayed on the display field 32 by the strapping unit and used in the strapping operations until the parameter values are changed again. The strapping operations themselves are triggered or started by the tensioning button 16, which is arranged in an ergonomically advantageous manner at the front end of the handle of the strapping unit 1, as a further actuating element. If the strapping unit 1 is held at the handle 3, the tensioning button 16 can be actuated with the thumb.

The strapping unit 1 is equipped with a button lock which can be switched on and off. By switching on the button lock, it is possible, inter alia, to prevent undesirable adjustment of previously undertaken settings at the strapping unit 1. For this purpose, in the exemplary embodiment, first of all a control button "function" 33, which is configured as a pushbutton and is located on the control panel of the strapping unit, has to be actuated and held. In addition, the tensioning button 16 arranged on the handle of the strapping unit has to be actuated by pressing. An acoustic signal then sounds and confirms that the keypad of the control panel is now locked. From then on, no changes to the settings can be undertaken via the control panel until the button lock is released again. The strapping unit may still carry out strappings which are triggered by actuation of the tensioning button 16. If, in this state, a button of the control panel is nevertheless actuated, an optical signal indicating that locking is present appears in the display field of the control panel. For this purpose, for example, an "L" for "locked" can be displayed. The button lock is unlocked in the same manner as the button lock was switched on, namely by actuation and holding of the operating button "function" 33 and by additional actuation of the tensioning button 16.

However, the button lock can be used also specifically to block only individual functions. For this purpose, the corresponding function button 30, 31, for example that for setting the welding time, can be actuated and held. While (only) one of the particular function buttons 30, 31 is still pressed, the tensioning button can then be actuated, as a result of which, from then on, adjustments to the welding time, which is changeably adjustable per se, are no longer possible, since they are locked. In the same manner, other parameter adjustments which are individually selectable, in particular the tensioning force, can also be prevented in a specific manner. All that then needs to be done is to first of all press and to hold the function button 30, 31 corresponding to said function, for example for the tensioning force, and subsequently to press the tensioning button 16. All of said locks can be canceled in the same manner as they have been activated, namely also by pressing the corresponding function button 30, 31 and the tensioning button 16. In alternative embodiments, unlocking can also be undertaken in a different manner, for example by means of a separate unlocking button which is only assigned this function.

In addition, the button lock present on the strapping unit also has a mode by means of which the use of the strapping unit 1 can be entirely locked. Said lock is activated by the controlling means 34 of the strapping unit upon switching into the fully automatic operating mode and has the consequence that two buttons have to be actuated simultaneously to trigger a fully automatic strapping operation with the band "tensioning", "sealing" and "cutting" operations. In the exemplary embodiment, these are the tensioning button 16 arranged in the region of the front end of the handle 3 and next to the control panel and the release button 35 arranged in the region of the rear end and of the battery 15. The two buttons 16, 35 are at a distance from each other which does not allow an operator holding the strapping unit at the handle 3 by one hand to press the tensioning and the release button 16, 35 at the same time with said hand. The operator has to use his/her second hand for this purpose, thus making it possible to prevent inadvertent triggering of the strapping unit.

Each aspect of the concept of operation of the strapping unit concerning the described operation modes of the strapping unit as well as preselecting and setting certain parameters of the strapping method has relevance as preferred embodiments. Each of said aspects has also relevance as separate invention which is independent from other aspects of the present invention.

An algorithm by means of which, after the formation of a seal has taken place by friction welding of the two band ends lying one above the other in the strapping unit, a cooling time period for the seal is variably determined is stored in the controlling means 34 of the strapping apparatus. The cooling time begins at the end of the movement of the welding shoe 20. During the cooling time, the band is clamped in the strapping unit in the same manner as during the friction-welding phase in the strapping unit and therefore the seal which has just been formed is relieved of the band tension during the solidification phase of the band material.

At the strapping unit 1, it is possible to set welding times of differing length at the control panel. In the exemplary embodiment, a total of, for example, seven stages are provided and are selectable for this purpose for the welding time period. Each of the seven welding times of differing length is assigned a cooling time of differing length. In this case, the assignment is undertaken in such a manner that the longer the welding time, the longer also is the assigned cooling time. Said allocation is preferably non-changeable.

In addition, the tensioning force which is present at the circumference of the tensioning wheel 7 and is transmittable to the band can be set at the strapping unit. The tensioning force can also be set in a plurality of stages, for example nine stages. Each of said settable tensioning force is assigned one of a plurality of factors with which the controlling means multiplies the cooling time arising from the welding time. Also in this case, the factor is larger, the longer the welding time. The time value arising from this multiplication with one of a plurality of factors is used by the controlling means as the actual cooling time. The controlling means keeps the band clamped in the strapping unit by means of the clamping device thereof during said (actual) cooling time and does not yet release said band. This means that, during this time, the band cannot be removed from the strapping unit. If, for example, at stage three of the welding time the cooling time is 3 s and at tensioning stage seven the factor is 2, this results in an actual cooling time of 3 s×2=6 s. After the end of this time, the controlling means opens or releases the clamping, as a result of which the strapping unit can be moved away from the band and the strapping produced.

LIST OF REFERENCE NUMBERS

1 Strapping unit
2 Housing
3 Handle
4 Base plate
5 Base surface
6 Tensioning device
7 Tensioning wheel
8 Rocker
8a Rocker pivot axis
9 Rocker lever
13 Friction-welding device
14 Motor
15 Battery
16 Tensioning button
17 Mode switch
18 Actuating element
19 Tensioning button
20 Welding shoe
21 Welding counter-holder
22 Counter-holder surface
23 Direction
24 Longitudinal course
25 Outer side
27 Tensioning counter-holder
28 Tensioning counter-holder surface
30 Welding time button
31 Tensioning force button
32 Display field
33 Operating button "function"
34 Controlling means
35 Release button

The invention claimed is:

1. A strapping apparatus for strapping articles with a strapping band, comprising:
   a base plate for positioning on an article;
   a tensioning device for applying a tension to the strapping band, the tensioning device having an actuatable tensioning tool configured to be brought into and out of contact with the band;
   a sealing device with which, by contact with the band, two band layers are permanently connected to each other by forming a seal between the two band layers, the sealing device including a counter-holder having a planar counter-holder surface for bearing against one side of the band and a sealing head having an inclined planar surface for bearing against another side of the band while a seal is produced; and
   a clamping device for clamping the band in the strapping apparatus at a first angle corresponding to a direction transverse to a longitudinal direction of the band,
   wherein the counter-holder surface is inclined at a second angle relative to the first angle, and the strapping apparatus produces a twist of the band in a band section adjoining the sealing device in response to pressing of the band between the sealing head and the counter-holder, at least while the seal is produced, relative to the longitudinal direction of the band.

2. The strapping apparatus of claim 1, wherein the clamping device includes opposed clamping surfaces and a normal of one of the clamping surfaces and a normal of the counter-holder surface of the sealing device intersect a center of the band.

3. The strapping apparatus of claim 1, wherein the tensioning device is the clamping device, wherein the tensioning device has a tensioning wheel and a tensioning counter-holder opposite the tensioning wheel, and wherein when the seal is produced, the band is clampable between the tensioning wheel and the tensioning counter-holder.

4. The strapping apparatus of claim 1, wherein the twist of the band is carried out surrounding the sealing device by clamping the band in the sealing device.

5. The strapping apparatus of claim 1 wherein a base surface of the base plate and the counter-holder surface are arranged non-parallel with respect to a cross section through the strapping apparatus and enclose an angle different from zero.

6. The strapping apparatus of claim 5, wherein the base plate and the counter-holder surface enclose an angle of 1° to 45°.

7. The strapping apparatus of claim 6, wherein the base plate and the counter-holder surface enclose an angle of 2° to 10°.

8. The strapping apparatus of claim 1 wherein the band tension is reduced after applying a tension to the strapping band and during production of the seal on the band section between the clamping device and the tensioning device.

9. The strapping apparatus of claim 1 wherein the strapping apparatus is a mobile strapping apparatus.

10. The strapping apparatus of claim 9 wherein the strapping apparatus is battery-operated.

11. The strapping apparatus of claim 1 wherein the clamping device has at least one clamp with two interacting clamping elements for clamping the band between the clamping elements.

12. A method for strapping an article, in which a band loop is formed from a strapping band and placed around the article and is positioned in a strapping apparatus, comprising:
   tensioning the band loop;
   clamping the band loop at a first angle corresponding a direction transverse to a longitudinal direction of the band;
   sealing overlying layers of the band loop by a sealing device, wherein the band is arranged twisted in a band section upstream of the sealing device when the seal is produced,
   wherein the sealing device comprises a welding shoe and a counter-holder having a planar counter-holder surface inclined at a second angle relative to the first angle such that band is twisted in response to pressing of the band between an inclined planar surface of the welding shoe and the inclined planar counter-holder surface of the counter-holder.

13. The method of claim 12, wherein the twisted band section is located at least between a clamping point of the band in the strapping apparatus and the sealing device.

14. The method of claim 12, wherein the listing is carried out during a closure of the sealing device.

* * * * *

UNITED STATES PATENT AND TRADEMARK OFFICE
CERTIFICATE OF CORRECTION

PATENT NO.         : 9,487,314 B2
APPLICATION NO.    : 14/357959
DATED              : November 8, 2016
INVENTOR(S)        : Flavio Finzo Page 1 of 1

It is certified that error appears in the above-identified patent and that said Letters Patent is hereby corrected as shown below:

In the Specification

Column 4, Line 67, "switch is" to read as --switch 17 is--.

Column 5, Line 40, "surface of" to read as --surface 28 of--.

Column 8, Line 8, "button can" to read as --button 16 can--.

In the Claims

Column 10, Line 7, Claim 1, "hand" to read as --band--.

Column 11, Line 9, Claim 14, "listing" to read as --twisting--.

Signed and Sealed this
Eighteenth Day of April, 2017

Michelle K. Lee
*Director of the United States Patent and Trademark Office*